United States Patent [19]

Broadwell

[11] Patent Number: 4,466,100
[45] Date of Patent: Aug. 14, 1984

[54] DELTA WING NOZZLE ASSEMBLY FOR CHEMICAL LASERS

[75] Inventor: James E. Broadwell, Redondo Beach, Calif.

[73] Assignee: The United States of America as represented by the Secretary of the Air Force, Washington, D.C.

[21] Appl. No.: 382,324

[22] Filed: May 26, 1982

[51] Int. Cl.³ .............................................. H01S 3/02
[52] U.S. Cl. ..................................... 372/89; 372/701
[58] Field of Search .................... 372/89, 90, 701, 58; 239/556, 557

[56] References Cited

U.S. PATENT DOCUMENTS 4,237,429 12/1980 Hook et al. ........................... 372/89
4,375,687 3/1983 Hook et al. ........................... 372/89

*Primary Examiner*—James W. Davie
*Attorney, Agent, or Firm*—Donald J. Singer; Jacob N. Erlich

[57] ABSTRACT

A delta wing nozzle assembly for use within a supersonic chemical laser having a plurality of delta wing-shaped elements which substantially increases the mixing rate of the active reactive gaseous ingredients injected into the resonant cavity of the laser. Each of the plurality of delta wing-shaped elements being of a triangular configuration in which the shape thereof is such that the flow of the gaseous ingredients thereover, normal to the leading edge of the triangular-shaped element, is subsonic. This increased mixing rate substantially increases the output power of the laser.

11 Claims, 4 Drawing Figures

DELTA WING NOZZLE ASSEMBLY FOR CHEMICAL LASERS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to chemical lasers, and, more particularly, to a delta wing nozzle assembly for use within a chemical laser in order to increase the mixing rate between the reactive ingredients within the resonant cavity of the laser.

The development of the laser has created a new area of technology which finds application in many systems already in existence today. For example, lasers can be found in the areas of optical communications, holography, medicine, cutting, calculating and in radar. The utilization of the laser in such areas is in many instances dependent upon the amplification of the existing laser radiation.

One type of laser which has rapidly gained acceptance in such areas as optical communications and optical radar where high output power is highly desirable is the chemical laser. The chemical laser refers to a laser in which the required population inversion necessary for laser operation is achieved directly by chemical reaction. An example of such a chemical laser is the HF or DF, continuous wave supersonic chemical laser.

In general, mixing of the reactive ingredients (oxidizer and fuel) of the chemical laser is accomplished by the injection of the reactive ingredients into the resonant or optical cavity by means of of mixing nozzles. For example, a plurality of parallel nozzles inject an oxidizer such as atomic fluorine in an inert diluent such as He, Ar, $N_2$, etc. at supersonic speeds into the resonant cavity. Molecular hydrogen (or deuterium) fuel is also injected into the cavity between the fluorine nozzles and reacts with the atomic fluorine to produce HF* or DF*.

The requirement to achieve the rapid mixing of the two supersonic streams of reactive ingredients has resulted in fine scale nozzle arrays requiring costly fabrication techniques and multiple assembly processes. These designs consist of multiple modules, each of which contain a large number of cavity injector nozzles. Failure of any one nozzle element can result in the loss of the module and perhaps the loss of the entire device. The viscous losses inherent in these fine scale nozzle arrays necessitates large quantities of diluent gas to maintain supersonic flow in the resonant cavity in the presence of the heat release from the cavity lasing reaction. This results in significant system penalties when compared to the theoretical potential achievable if these viscous losses could be minimized. The large thermal and viscous losses inherent in the conventional nozzle arrays result from the large exposed surface areas and small dimensions. These losses are present in all of the current high pressure devices, and their existence prevents the achievement of the full potential of the chemical laser.

Consequently, there continues to exist a requirement for a more satisfactory device for mixing the reactive ingredients in the optical or resonant cavity of a chemical laser. Lower practical limits in nozzle dimensions have been reached and while transverse jet injection schemes have proved effective in increasing the mixing rate and, hence, performance, they have brought about other undesirable features and limitations such as loss in mode length and operation in an unfavorable high temperature, low Mach number regime.

SUMMARY OF THE INVENTION

The present invention sets forth a delta wing nozzle assembly for chemical lasers which overcomes the problems set forth in detail hereinabove by substantially increasing the mixing rate of the reactive ingredients in chemical lasers without the inherent problems associated with past nozzle design.

The nozzle assembly design of this invention incorporates delta wing elements within the individual nozzles in order to generate trailing vorticies which, in turn, substantially increase the mixing rate between the reactive streams. In such a design, the leading edge of the delta wing is swept back to produce a "subsonic leading edge", that is, one in which the Mach number normal to the leading edge is subsonic or less than one.

An alternate embodiment of the present invention provides for the injection of the fuel (molecular hydrogen or deuterium) directly from the trailing edges of the delta wing elements and therefore completely eliminates the need for individual fuel nozzles.

It is therefore an object of this invention to provide a delta wing nozzle assembly for chemical lasers which substantially increases the mixing rate between the reactive ingredients of the laser.

It is another object of this invention to provide a delta wing nozzle assembly for chemical lasers which injects the fuel directly from the delta wing thereby eliminating the need for individual fuel nozzles.

It is still another object of this invention to provide a delta wing nozzle assembly for chemical lasers which substantially increases laser efficiency in supersonic flows.

It is a further object to provide a delta wing nozzle assembly for chemical lasers which is economical to produce and which utilizes currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE PREFERRED EMBODIMENTS

Figure 1:
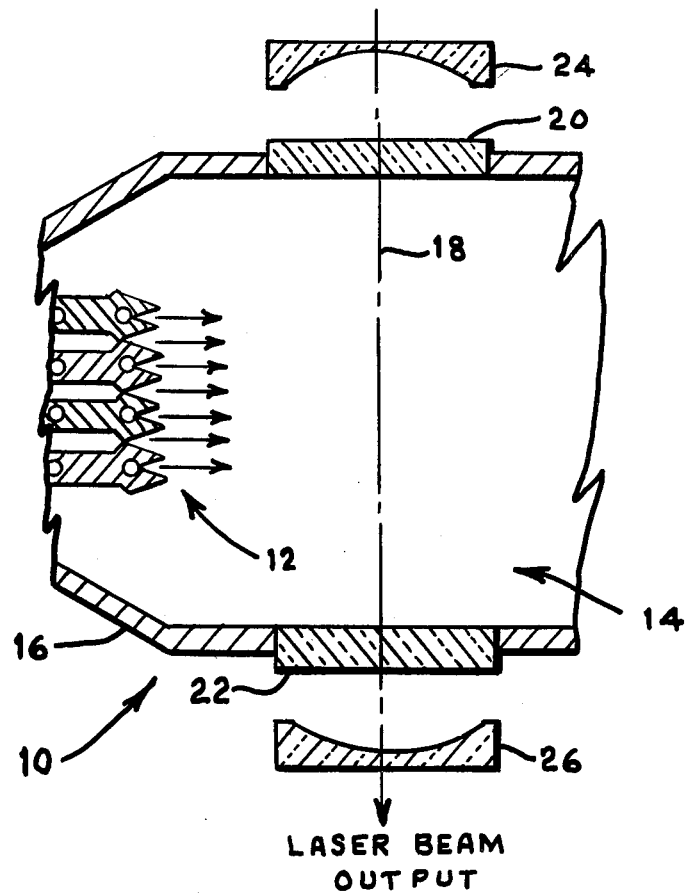
FIG. 1 is a schematic representation, shown in partly segmented fashion, of the optical or resonant cavity of a chemical laser illustrating the delta wing nozzle assembly (with the delta wing elements being illustrated in detail in FIG. 2) of this invention positioned therein.

Reference is now made to FIG. 1 of the drawing which schematically illustrates a portion of a typical chemical laser 10 which incorporates therein the delta wing nozzle assembly 12 of the present invention. The optical or resonant cavity 14 of chemical laser 10 is formed within a housing 16 having an optical axis 18 transverse to the flow path of the gaseous reactive ingredients of chemical laser 10. Typically, optical axis 18 is bounded by a pair of windows 20 and 22 and a pair of reflective elements, respectively. The reflective elements are preferably in the form of a substantially totally reflective mirror 24 and a partially transmissive mirror 26, respectively, with the laser output passing through partially transmissive mirror 26.

The active gaseous ingredients for chemical laser 10 can vary within the scope of this invention but preferably take the form of an oxidizer such as atomic fluorine and a fuel such as molecular hydrogen or deuterium, both being carried within an inert gas such as helium of nitrogen. The source for these gases is not shown but the gases are injected into resonant cavity 14 through nozzle assembly 12 at supersonic speeds. These active ingredients combine within the resonant cavity 14 and the ensuing chemical reaction causes a lasing action to take place within resonant cavity 14.

As stated hereinabove, a great need exists for a means of substantially increasing the mixing capability of the reactive ingredients as they are injected into resonant cavity 14. The instant invention provides a delta wing nozzle assembly 12 clearly shown in FIGS. 2 and 3 of the drawing which increases the mixing rate in chemical lasers. It has been established that current chemical lasers operate in the high temperature, low Mach number regime at something less than the optimum performance range. In such a regime, the laser performance is critically dependent on the mixing rate. The mixing rate can be maximized by adding additional nozzles, however, this drives temperatures higher and Mach numbers lower. If the number of nozzles are reduced to achieve the low temperature condition, the mixing rate becomes extremely slow.

Figure 2:
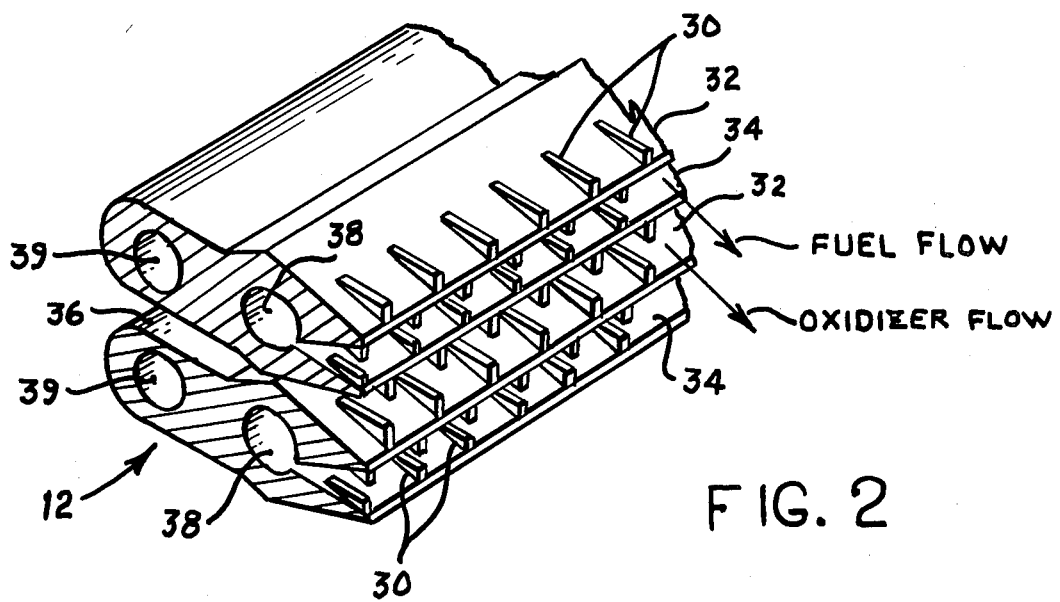
FIG. 2 is a pictorial representation of the delta wing nozzle assembly of this invention shown partly in segmented fashion.

As shown in FIG. 2 of the drawing, the delta wing nozzle asssembly 12 of the present invention positions a plurality of spaced apart delta wing elements 30 within the exit region of the oxidizer and fuel nozzles 32 and 34, respectively, of nozzle assembly 12. In such an arrangement the fuel-oxidizer interface is entrained into the vortices which trail the delta wing elements 30. The resulting increase in the interface area enhances the mixing rate of the reactive ingredients.

Figure 3:
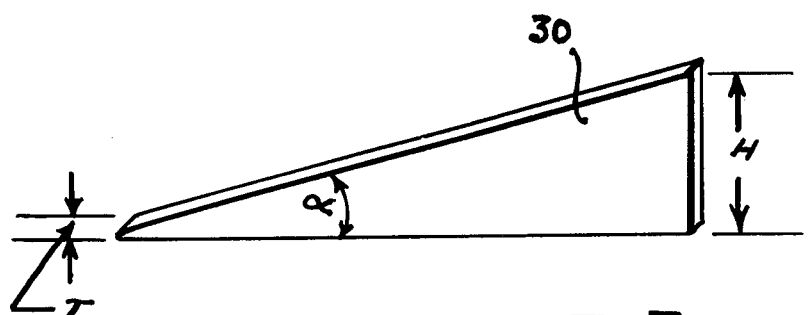
FIG. 3 is a schematic, side elevational view of the delta wing configuration of this invention.

More specifically, to accomplish the above-mentioned increased mixing rate each delta wing element 30 is swept back in the triangular configuration clearly shown in FIG. 3 of the drawing in such a manner as to produce a "subsonic leading edge". In other words, the Mach number normal to the leading edge is subsonic or less than one; or stated more succinctly, the component of the flow of gas normal to the leading edge, $M_{\infty n}$, is $<1$. An illustrative example of such a leading edge would have a leading edge angle, $\alpha$, preferably less than 10°. Typical dimensions for each delta wing element 30 are as follows; a height, H, of approximately 0.20 inches and a thickness, T, as thin as structurally possible, that is approximately 0.020 inches. Furthermore, as shown in FIG. 2 of the drawing each delta wing nozzle 30 is spaced apart approximately twice the height thereof or about 0.40 inches from each other.

Oxidizer in the form of molecular fluorine carried by a suitable inert gas diluent is fed through input channel 36 to nozzle 32 while the fuel in the form of molecular hydrogen or deuterium carried by a suitable inert gas diluent is flows from lines 38 through nozzle 34. Any suitable coolant, in the form of, for example water, for nozzle assembly 12 is fed through lines 39 in a conventional manner. The active reactive ingredients pass through nozzles 32 and 34 and over delta wing elements 30. Because of the unique design of delta wing elements 30 set forth in detail hereinabove the mixing rate of the reactive ingredients as they are injected into resonant cavity 14 is greatly increased. Consequently, a more efficient lasing operation can take place and a higher laser output is possible.

Figure 4:
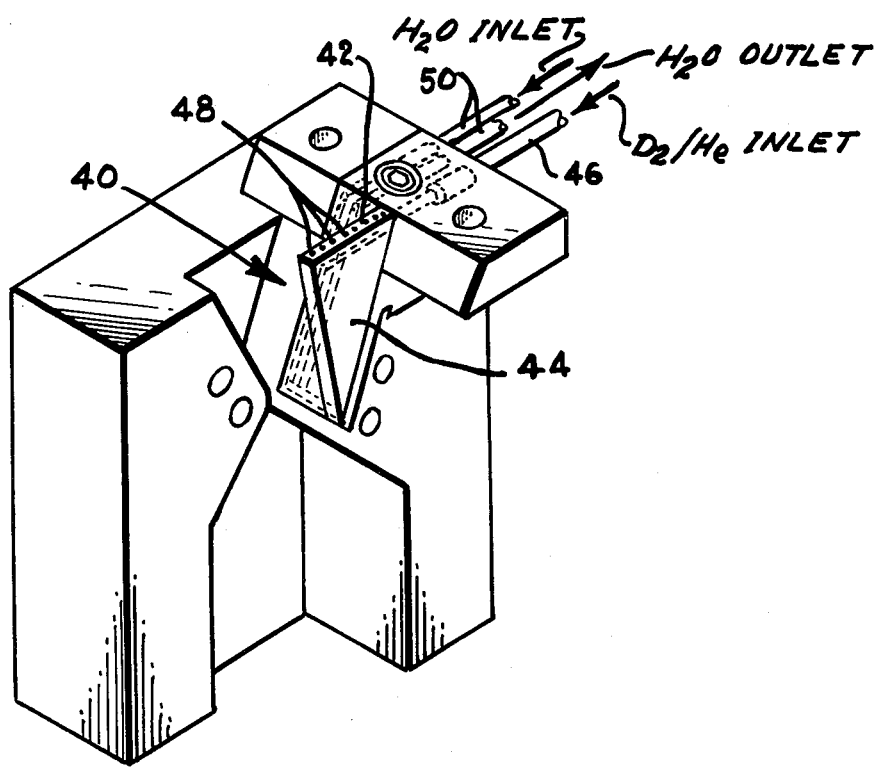
FIG. 4 is a pictorial representation of an alternate embodiment of the delta wing nozzle assembly of this invention.

In addition to the above nozzle assembly 12 it is possible within the confines of this invention to provide a plurality of oxidizer nozzles of which only one is 40 shown in FIG. 4 of the drawing. In such an arrangement, individual fuel nozzles are eliminated. The elimination of individual fuel nozzles adjacent the oxidizer nozzles as shown in FIGS. 1 and 2 can be accomplished by injecting the fuel directly through the trailing edge 42 of each of the delta wing elements 44 which are positioned within the oxidizer nozzles 40. In the embodiment illustrated in FIG. 4, the delta wing elements 44 are placed within the oxidizer nozzle 40 similar to the manner shown in FIG. 2. The fuel in the form of molecular hydrogen or deuterium carried in an inert gas diluent is fed into each delta wing element 44 by input lines 46 and is injected into resonant cavity 14 by delta wing element 44 through a plurality of closely spaced orifices 48. Coolant in the form of water, for example, is fed through input and output lines 50. The design of each delta wing element 44 is substantially identical to delta wing element 30 depicted in FIG. 3 of the drawing and therefore its detailed dimensions are not repeated.

This delta wing shape or design has low wave drag but high induced drag which manifests itself in the generation of one or two strong trailing axial vortices. These vortices entrain the fuel-oxidizer active ingredients. Consequently, the thin delta wing elements produce a given amount of mixing with weaker accompanying mode waves and less momentum loss than mixing mechanisms of the past.

Although the invention has been described with reference to particular embodiments, it will be understood that this invention is also capable of further and other embodiments within the spirit and scope of the appended claims.

I claim:

1. A delta wing nozzle assembly for use in a chemical laser, comprising:

means for injecting a pair of reactive gaseous ingredients at supersonic velocity into a preselected location within said laser;

means interconnected with said injecting means for mixing said reactive gaseous ingredients, said mixing means being in the form of a plurality of delta wing-shaped elements, each of said delta wing-shaped elements being of a triangular configuration and having a leading edge swept back at a preselected angle such that the component of the flow of at least one of said reactive gaseous ingredients normal to said leading edge has a Mach number less than one.

2. A delta wing nozzle assembly as defined in claims 1 wherein said leading edge angle of said delta wing-shaped element is approximately 10 degrees.

3. A delta wing nozzle assembly as defined in claim 2 wherein the height of each of said delta wing-shaped elements is approximately 0.20 inches.

4. A delta wing nozzle assembly as defined in claim 3 wherein the thickness of each of said delta wing-shaped elements is approximately 0.020 inches.

5. A delta wing nozzle assembly as defined in claim 1 wherein said delta wing-shaped elements are spaced apart a distance approximately twice the height thereof.

6. A delta wing nozzle assembly as defined in claim 4 wherein said delta wing-shaped elements are spaced apart a distance approximately twice the height thereof.

7. A delta wing nozzle assembly as defined in claim 1 wherein said means for injecting said reactive gaseous ingredients comprises at least two nozzles, and said delta wing-shaped elements are located within each of said nozzles.

8. A delta wing nozzle assembly as defined in claim 1 wherein said means for injecting said reactive gaseous ingredients comprises at least one nozzle and a plurality of orifices within the trailing edge of said delta wing-shaped elements.

9. In a chemical laser having a resonant cavity and means for providing a pair of reactive gaseous ingredients for mixing therein, the improvement therein comprising:
   means for injecting said pair of reactive gaseous ingredients at supersonic velocity into said resonant cavity;
   means interconnected with said injecting means for mixing said reactive gaseous ingredients, said mixing means being in the form of a plurality of delta wing-shaped elements, each of said delta wing-shaped elements being of a triangular configuration and having a leading edge swept back at preselected angle such that the component of the flow of at least one of said reactive gaseous ingredients normal to said leading edge has a Mach number less than one.

10. In a chemical laser as defined in claim 9 wherein said means for injecting said reactive gaseous ingredients comprises at least two nozzles, and said delta wing-shaped elements are located within each of said nozzles.

11. In a chemical laser as defined in claim 9 wherein said means for injecting said reactive gaseous ingredients comprises at least one nozzle and a plurality of orifices within the trailing edge of said delta wing-shaped elements.

* * * * *